(12) United States Patent
Kimura et al.

(10) Patent No.: US 9,273,447 B2
(45) Date of Patent: Mar. 1, 2016

(54) CAB FOR CONSTRUCTION MACHINE AND CONSTRUCTION MACHINE

(71) Applicant: KOMATSU LTD., Tokyo (JP)

(72) Inventors: Naoki Kimura, Komatsu (JP); Motoo Furukawa, Komatsu (JP); Takanori Yamahata, Komatsu (JP); Masahiko Hamaguchi, Nomi (JP)

(73) Assignee: KOMATSU LTD., Tokyo (JP)

( * ) Notice: Subject to any disclaimer, the term of this patent is extended or adjusted under 35 U.S.C. 154(b) by 32 days.

(21) Appl. No.: 14/346,343

(22) PCT Filed: Mar. 26, 2013

(86) PCT No.: PCT/JP2013/058747
§ 371 (c)(1),
(2) Date: Mar. 21, 2014

(87) PCT Pub. No.: WO2014/155514
PCT Pub. Date: Oct. 2, 2014

(65) Prior Publication Data
US 2015/0218778 A1 Aug. 6, 2015

(51) Int. Cl.
*E02F 9/00* (2006.01)
*E02F 9/16* (2006.01)
*E02F 9/08* (2006.01)
*B60H 1/00* (2006.01)
*B62D 33/06* (2006.01)

(52) U.S. Cl.
CPC ............ *E02F 9/163* (2013.01); *B60H 1/00207* (2013.01); *B60H 1/00378* (2013.01); *E02F 9/0858* (2013.01); *B60H 2001/00228* (2013.01); *B62D 33/06* (2013.01); *B62D 33/0617* (2013.01); *E02F 9/16* (2013.01)

(58) Field of Classification Search
CPC .......... E02F 9/163; E02F 9/16; E02F 9/0858; B62D 33/0617; B62D 33/06; B60H 1/00207; B60H 1/00378; B60H 2001/0228
USPC ....................................... 296/190.09, 190.08
See application file for complete search history.

(56) References Cited

U.S. PATENT DOCUMENTS 4,088,364 A    5/1978   Termont
(Continued)

FOREIGN PATENT DOCUMENTS

| CN | 101668901 A | 3/2010 |
|---|---|---|
| JP | H05-106240 A | 4/1993 |
| JP | 2003-135206 A | 5/2003 |
| JP | 2004-083011 A | 3/2004 |

(Continued)

*Primary Examiner* — Joseph D Pape
*Assistant Examiner* — Dana Ivey
(74) *Attorney, Agent, or Firm* — Drinker Biddle & Reath LLP

(57) ABSTRACT

A duct connected to an air-conditioning apparatus includes a portion positioned closer to a side window than a console when viewed from above. A tray is arranged on the console on a side close to the side window, and covers an area above the duct. A lower end of the side window is positioned lower than an upper end of the console positioned on the side close to the side window in terms of height from a floor surface. The tray is positioned on or below an imaginary straight line A-A connecting the upper end to the lower end of the side window, and is not positioned above imaginary straight line A-A. Accordingly, high visibility can be ensured in an obliquely downward direction lateral to an operator while a satisfactory aesthetic appearance of indoor space in a cab is maintained.

6 Claims, 8 Drawing Sheets

(56) References Cited

U.S. PATENT DOCUMENTS

| | | |
|---|---|---|
| 5,413,188 A | 5/1995 | Ui |
| 6,450,284 B1 * | 9/2002 | Sakyo et al. ............. 180/329 |
| 2010/0102594 A1 | 4/2010 | Kimura et al. |
| 2012/0086236 A1 * | 4/2012 | Nagami et al. ......... 296/190.09 |

FOREIGN PATENT DOCUMENTS

| | | |
|---|---|---|
| JP | 2005-178480 A | 7/2005 |
| JP | 2006-273127 A | 10/2006 |
| JP | 2008-063812 A | 3/2008 |
| JP | 2013-028987 A | 2/2013 |

* cited by examiner (A)

(B)

CAB FOR CONSTRUCTION MACHINE AND CONSTRUCTION MACHINE

TECHNICAL FIELD

The present invention relates to a cab for construction machine and a construction machine.

BACKGROUND ART

In recent years, an air-conditioning apparatus has been arranged in a cab (operator's compartment) in order to improve working environment of an operator of a construction machine. The air conditioned by this air-conditioning apparatus is supplied through a duct to a prescribed outlet inside the cab. If this duct is exposed to the inside of the cab, the aesthetic appearance of indoor space in the cab is compromised.

Such a duct arranged in a cab is disclosed in Japanese Patent Laying-Open No. 2005-178480 (Patent Document 1), for example. In Japanese Patent Laying-Open No. 2005-178480, a duct is arranged so as to extend in a front-rear direction between a console and a side portion of a cab. A panel body extending longitudinally in the front-rear direction of the cab is provided above the duct.

CITATION LIST

Patent Document

PTD 1: Japanese Patent Laying-Open No. 2005-178480

SUMMARY OF INVENTION

Technical Problem

According to the arrangement described in the aforementioned publication, deterioration in aesthetic appearance of indoor space in the cab by the duct can be prevented because the panel body is provided above the duct. However, since the panel body is provided laterally to an operator's seat, visibility in an obliquely downward direction lateral to an operator sitting on the operator's seat will be impaired.

The present invention was made in view of the problem above, and an object thereof is to provide a cab for construction machine and a construction machine capable of ensuring high visibility in an obliquely downward direction lateral to an operator while maintaining a satisfactory aesthetic appearance of indoor space in the cab.

Solution to Problem

A cab for construction machine of the present invention is a cab for construction machine having an internal space, including an operator's seat, a side window, a console, an air-conditioning apparatus, and a cover. The operator's seat is arranged on a floor surface of the cab in the internal space. The side window is arranged laterally to the operator's seat. The console is arranged between the operator's seat and the side window. The air-conditioning apparatus is arranged in the internal space. The cover is arranged on the console on a side close to the side window with a bracket (interposed) between the console and the cover. A lower end of the side window is positioned lower than an upper end of the console positioned on the side close to the side window in terms of height from the floor surface. An upper end of the cover positioned on a side close to the side window is positioned on or below an imaginary straight line connecting the upper end of the console positioned on the side close to the side window to the lower end of the side window, and is positioned above the lower end of the side window.

According to the cab for construction machine of the present invention, the cover is arranged on the console on the side close to the side window. Accordingly, if a duct lies on the side of the console close to the side window, the cover covers an area above the duct, thus preventing exposure of the duct to the inside of the cab for construction machine. Accordingly, a satisfactory aesthetic appearance of the indoor space in the cab can be maintained.

The upper end of the cover positioned on the side close to the side window is positioned on or below the imaginary straight line connecting the upper end of the console positioned on the side close to the side window to the lower end of the side window. Accordingly, even in the construction where the lower end of the side window is positioned lower than the upper end of the console on the side close to the side window, the visibility of the operator looking at the lower end of the side window with the console interposed therebetween is not obstructed by the cover. Therefore, high visibility can be ensured in an obliquely downward direction lateral to the operator.

The cab for construction machine described above further includes a duct connected to the air-conditioning apparatus and having a portion positioned between the console and the side window when viewed from above.

Since the duct has the portion positioned between the console and the side window in this manner, the cover can cover an area above the duct to prevent exposure of the duct to the inside of the cab for construction machine, thus maintaining a satisfactory aesthetic appearance in the cab.

The cab for construction machine described above further includes an air duct extending in a top-bottom direction relative to the floor surface at a front side of the side window. The cover includes a notch portion at the front side, and is attached by fitting the notch portion with the air duct.

By providing the notch portion in this manner, the cover can be elongated toward the front while avoiding the air duct. Thus, a long object can be stably placed on the elongated cover. In addition, since the cover can be attached while being positioned relative to the air duct by the notch portion, the cover can be readily positioned when attached.

In the cab for construction machine described above, a gap space is provided between a rear portion of the cover relative to the notch portion and the side window.

By providing the gap space and not arranging a component between the rear portion of the cover relative to the notch portion and the side window in this manner, the visibility of the operator looking at the lower end of the side window with the console interposed therebetween is not obstructed by the component. Therefore, the visibility in an obliquely downward direction lateral to the operator can be further improved.

In the cab for construction machine described above, a concave portion and a convex portion arranged around the concave portion are provided in an upper surface of said cover.

This concave portion is formed with a depth relative to the convex portion. Thus, if an electronic device or the like is placed on this concave portion, obstruction of the visibility of the operator looking at the lower end of the side window with the console interposed therebetween by the electronic device is suppressed.

In the cab for construction machine described above, the position of a front end of the cover is aligned with the position of a front end of the console when viewed from above.

Accordingly, the front end of the cover and the front end of the console can be rendered substantially flush with each other when viewed from above, to further enhance the aesthetic appearance of the indoor space in the cab. Furthermore, since there is no level difference between the front end of the cover and the front end of the console when viewed from above, the operator can be prevented from tripping on or having the clothes caught on the level difference when moving within the indoor space in the cab or performing various operations.

A construction machine of the present invention includes any of the cabs for construction machine described above.

According to the construction machine of the present invention, high visibility can be ensured in an obliquely downward direction lateral to an operator while a satisfactory aesthetic appearance of indoor space in the cab is maintained.

Advantageous Effects of Invention

According to the present invention, as described above, a cab for construction machine and a construction machine capable of ensuring high visibility in an obliquely downward direction lateral to an operator while maintaining a satisfactory aesthetic appearance of indoor space in the cab can be realized.

DESCRIPTION OF EMBODIMENTS

An embodiment of the present invention will be described hereinafter with reference to the drawings.

First, the construction of a motor grader will be described with reference to FIG. 1 as an example of a construction machine in a first embodiment of the present invention. The present invention is applicable to construction machines including a cab, such as a hydraulic excavator and a bulldozer.

In the following description of the drawings, a front-rear direction refers to a front-rear direction of a motor grader 1. In other words, the front-rear direction refers to a front-rear direction viewed from an operator sitting on an operator's seat in a cab 3. In addition, a right-left direction or lateral refers to a direction of body width of motor grader 1. In other words, the right-left direction, the direction of body width or lateral refers to a right-left direction viewed from the aforementioned operator. In the following drawings, the front-rear direction is indicated by an arrow X, the right-left direction is indicated by an arrow Y, and the top-bottom direction is indicated by an arrow Z.

Figure 1:
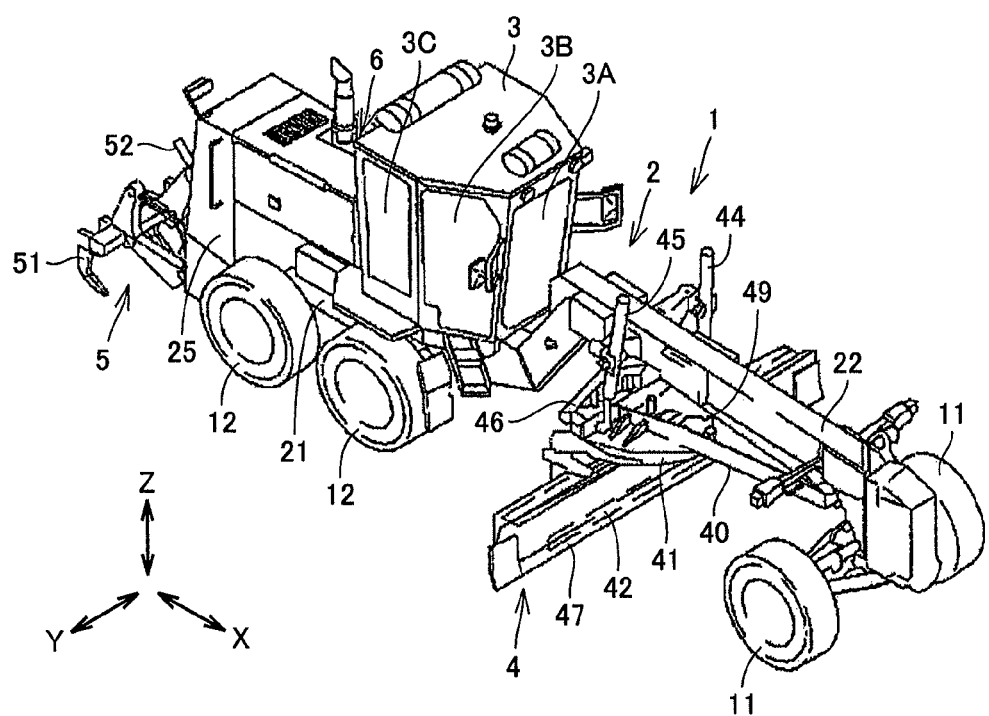
FIG. 1 is a perspective view schematically showing the construction of a motor grader in one embodiment of the present invention.

Referring to FIG. 1, motor grader 1 in this embodiment can perform ground leveling work, snow removal work, light cutting, mixing of materials and the like, by using a blade 42. This motor grader 1 mainly includes travel wheels 11 and 12, a body frame 2, cab 3, a work implement 4, and a rear work implement 5. Motor grader 1 further includes components such as an engine arranged in an engine compartment 6.

Travel wheels 11 and 12 consist of front wheels 11 and rear wheels 12. Although FIG. 1 shows the travel wheels consisting of two front wheels 11, with one wheel on each side, and four rear wheels 12, with two wheels on each side, the numbers and arrangement of the front and rear wheels are not limited as such.

Body frame 2 consists of a rear frame 21, a front frame 22, and an exterior cover 25.

Rear frame 21 supports exterior cover 25, and the components such as the engine arranged in engine compartment 6. Exterior cover 25 covers engine compartment 6. The exemplary four rear wheels 12 described above are attached to rear frame 21 such that they can be driven to rotate by a driving force from the engine.

Front frame 22 is attached to the front of rear frame 21. The exemplary two front wheels 11 described above are rotatably attached to a front end of front frame 22.

Cab 3 is mounted on front frame 22. A handle, a speed change lever, a control lever of work implement 4, a brake, an accelerator pedal, an inching pedal and the like (not shown) are provided in cab 3. Cab 3 may be mounted on rear frame 21.

Work implement 4 mainly includes a drawbar 40, a circle 41, blade 42, a hydraulic motor 49, and various hydraulic cylinders 44 to 47.

A front end of drawbar 40 is swingably attached to the front end of front frame 22. A rear end of drawbar 40 is supported on front frame 22 by a pair of lift cylinders 44 and 45. The rear end of drawbar 40 can be lifted and lowered in the top-bottom direction relative to front frame 22 by synchronous expansion and contraction of this pair of lift cylinders 44 and 45. Drawbar 40 can also swing in the top-bottom direction about an axis along a direction of travel of the vehicle by different expansion and contraction of lift cylinders 44 and 45.

A drawbar shift cylinder 46 is attached to a lateral end of each of front frame 22 and drawbar 40. Drawbar 40 can move in the right-left direction relative to front frame 22 by expansion and contraction of this drawbar shift cylinder 46.

Circle 41 is rotatably attached to the rear end of drawbar 40. Circle 41 can be driven to rotate in a clockwise or counterclockwise direction when viewed from above the vehicle relative to drawbar 40, by hydraulic motor 49.

Blade 42 is supported so as to be able to slide in the right-left direction relative to circle 41 and so as to be able to swing in the top-bottom direction about an axis parallel to the right-left direction. Specifically, blade shift cylinder 47 is attached to circle 41 and blade 42, and is arranged along a longitudinal direction of blade 42. This blade shift cylinder 47 allows blade 42 to move in the right-left direction relative to circle 41.

A tilt cylinder (not shown) is attached to circle 41 and blade 42. By expansion and contraction of this tilt cylinder, blade 42 can swing about the axis parallel to the right-left direction relative to circle 41, and change an orientation in the top-bottom direction. As a result, the tilt cylinder can change a tilt angle of blade 42 relative to the direction of travel.

As described above, blade 42 is constructed such that it can be lifted and lowered in the top-bottom direction relative to the vehicle, change the tilt relative to the direction of travel, change the tilt relative to the lateral direction, rotate, and be shifted in the right-left direction, via drawbar 40 and circle 41.

Rear work implement 5 can be attached to and detached from motor grader 1. Thus, motor grader 1 may not include rear work implement 5. Rear work implement 5 includes a ripper 51, a lift cylinder 52 and the like. Ripper 51 is used for excavation work, and is attached to rear frame 21 such that it can be lifted and lowered. Lift cylinder 52 is driven by hydraulic pressure provided from a hydraulic pump. A rear end of ripper 51 can move in the top-bottom direction by expansion and contraction of lift cylinder 52.

Next, the construction of cab 3 used in motor grader 1 in FIG. 1, which is cab 3 for construction machine in one embodiment of the present invention, will be described with reference to FIGS. 2 to 7.

Figure 2:
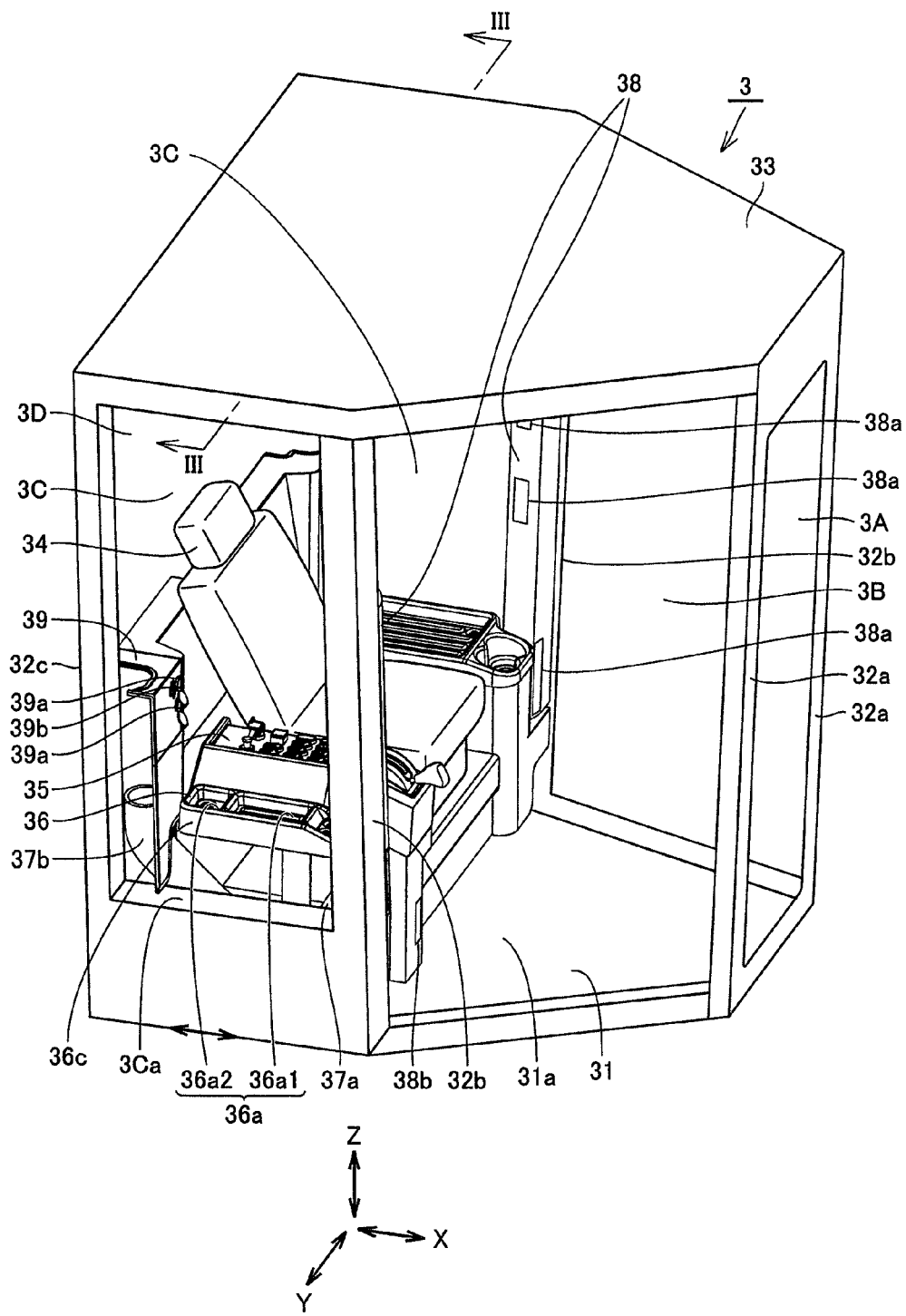
FIG. 2 is a perspective view schematically showing the construction of a cab of the motor grader shown in FIG. 1 from above the right front.

Referring to FIG. 2, cab 3 in this embodiment mainly includes a floor plate 31, a pair of front pillars 32a, a pair of center pillars 32b, a pair of rear pillars 32c, a roof 33, and an operator's seat 34.

The pair of front pillars 32a, the pair of center pillars 32b and the pair of rear pillars 32c are provided to stand from floor plate 31 in the top-bottom direction (Z direction in the figure). Roof 33 is supported on upper ends of these pillars 32a, 32b and 32c. A space surrounded by floor plate 31, pillars 32a, 32b, 32c and roof 33 is defined as indoor space (internal space) in cab 3.

In this indoor space, operator's seat 34 on which an operator is to sit is arranged on floor surface 31a of floor plate 31. A front window 3A is arranged between the pair of front pillars 32a in front of operator's seat 34 (front side in the X direction in the figure).

A door 3B (FIG. 1) is arranged between front pillar 32a and center pillar 32b obliquely in front of operator's seat 34 both on the right and left. This door 3B allows the operator to get in and out of cab 3, and is attached such that it can be opened and closed with respect to cab 3. This door 3B is provided with a window for improving working visibility of the operator.

A side window 3C is arranged between center pillar 32b and rear pillar 32c laterally to operator's seat 34 both on the right and left (Y direction in the figure). A rear window 3D is arranged between the pair of rear pillars 32c behind operator's seat 34 (rear side in the X direction in the figure).

Figure 3:
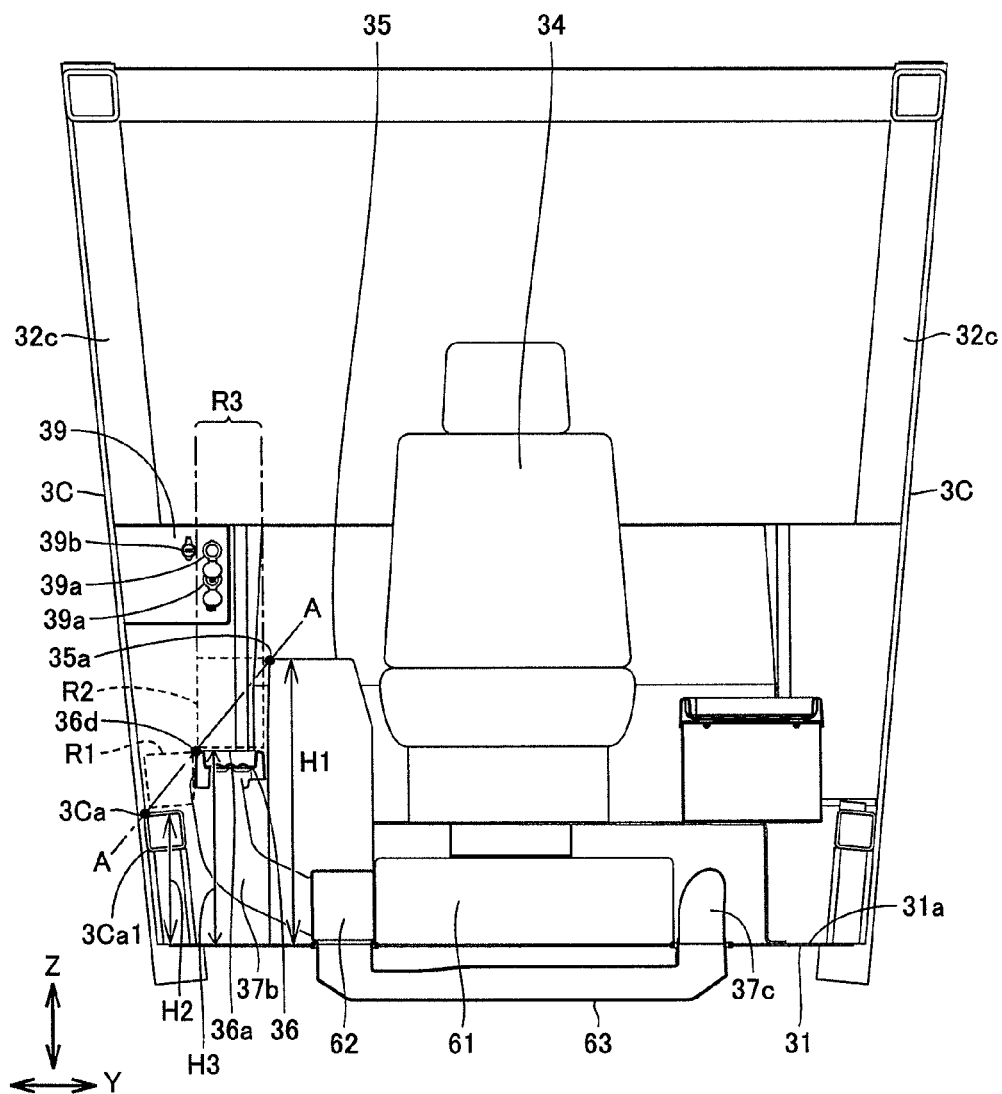
FIG. 3 is a schematic cross-sectional view along the line in FIG. 2.

Referring to FIGS. 2 and 3, cab 3 further includes a console 35, a cover 36, ducts 37a to 37c, air ducts 38, a rear panel 39, an air-conditioning apparatus 61, a branch duct 62, and a connection duct 63.

Console 35 is arranged on floor surface 31a of floor plate 31 in the indoor space in cab 3, for example, between operator's seat 34 and side window 3C on the right. This console 35 is arranged adjacent and laterally to operator's seat 34 on the right, for example, so that it can be readily operated by the operator sitting on operator's seat 34. A control unit including a control lever, various control switches and the like is arranged in console 35.

Figure 9:
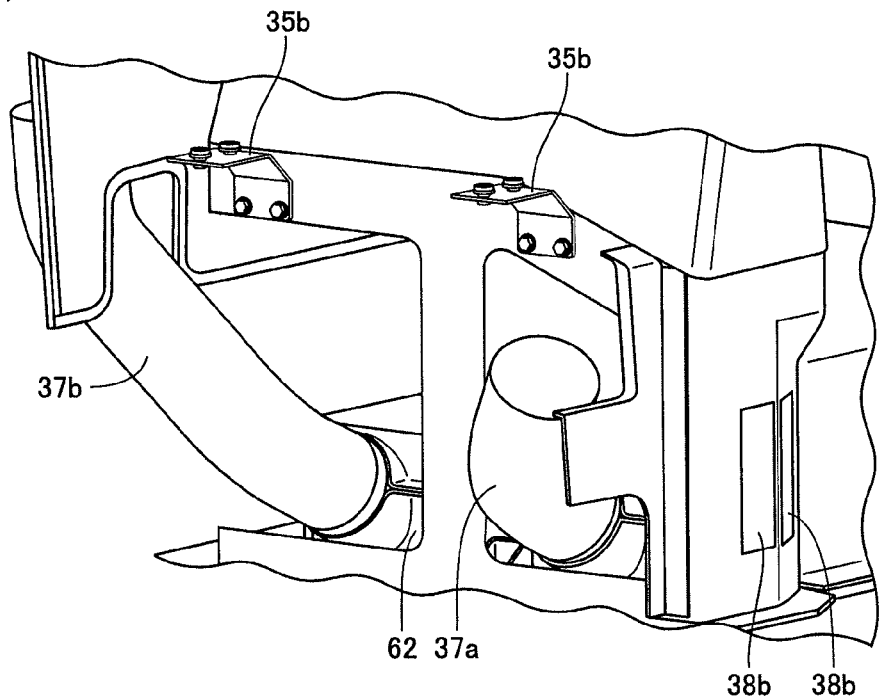
FIG. 9 are a schematic perspective view (A) showing a state in which brackets have been attached to a side portion of the console, and a schematic perspective view (B) showing a state in which the cover has been attached to the top of the brackets.
Figure 9:
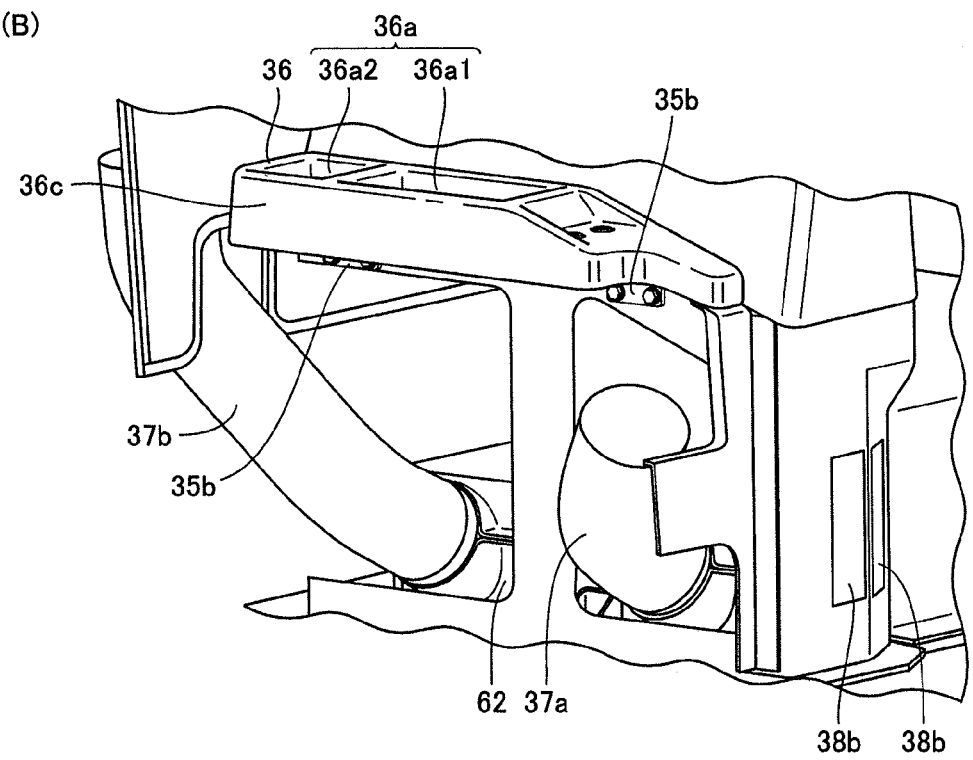

Cover 36 is arranged above floor plate 31 in the indoor space in cab 3, between console 35 and side window 3C on the right. As shown in FIGS. 9(A) and (B), cover 36 is fixed to console 35 via brackets 35b. Specifically, brackets 35b are fixed to a side portion of console 35 by bolts and the like, and cover 36 is fixed to brackets 35b by bolts and the like.

Cover 36 may be a tray provided with a concave portion 36a in its upper surface. This concave portion 36a serves to mount an electronic device thereon, for example, and may include two concave portions 36a1 and 36a2, for example. At least one of two concave portions 36a1 and 36a2 preferably has a size and a depth that substantially allow accommodation therein of a handheld terminal (a mobile phone, a smart-phone, a tablet, etc.) with a 5-inch-size screen.

Each of two concave portions 36a1 and 36a2 is surrounded by a convex portion of an upper surface of cover 36. The numbers, shapes and the like of the concave portions and convex portion provided on the upper surface of cover 36 are not limited to above.

Air-conditioning apparatus 61 is arranged in the indoor space in cab 3, for example, between operator's seat 34 and floor plate 31. This air-conditioning apparatus 61 serves to condition the air (adjust an indoor environment such as temperature, humidity and air cleanliness), and blow the conditioned air. An air outlet of air-conditioning apparatus 61 is connected to branch duct 62. This branch duct 62 is arranged on the right of air-conditioning apparatus 61, for example.

Figure 4:
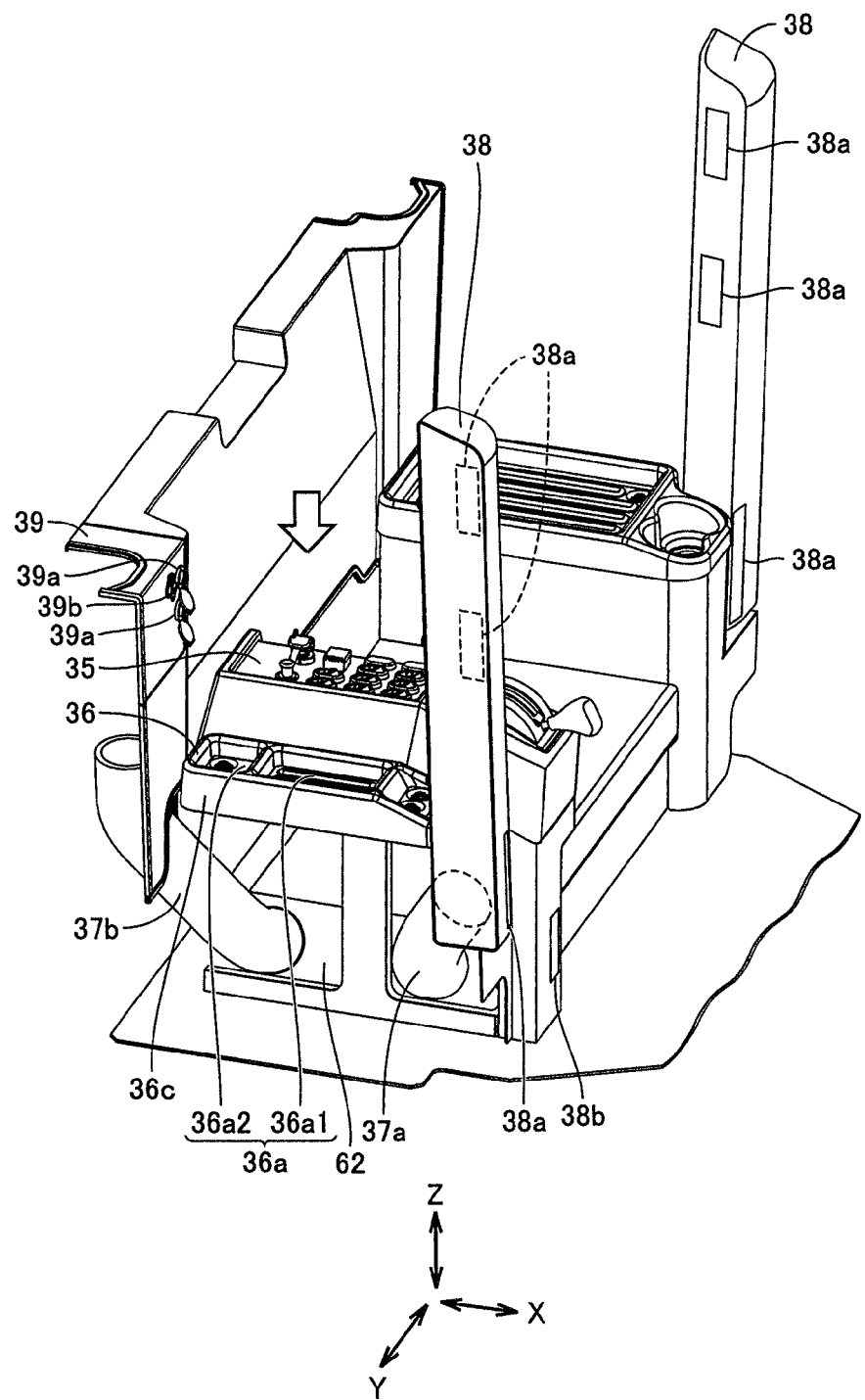
FIG. 4 is a schematic perspective view from above the right front, in which pillars, an operator's seat and the like are omitted from the construction of the cab of the motor grader shown in FIG. 2.

Referring to FIG. 4, this branch duct 62 is directly connected to duct 37a and duct 37b. In other words, both duct 37a and duct 37b are connected to air-conditioning apparatus 61 via branch duct 62.

Figure 6:
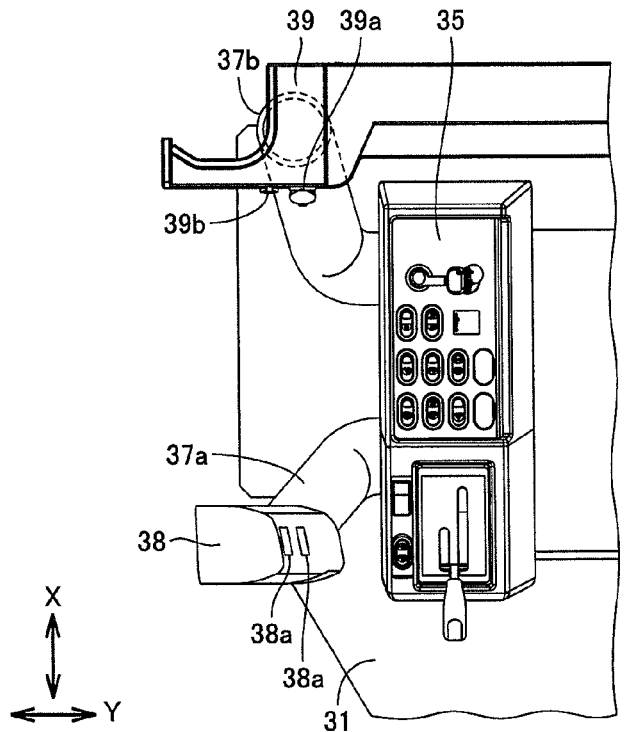
FIG. 6 is a schematic plan view (top view) showing the construction near a console and a cover when viewed in a direction of an outline arrow in FIG. 4, in which the cover is omitted.

Both duct 37a and duct 37b are arranged to extend through an area directly below (beneath) console 35 from a connection portion with branch duct 62, and to project (extend) toward side window 3C on the right, for example, relative to the area directly below console 35. As such, both duct 37a and duct 37b include portions positioned closer to side window 3C on the right than console 35 when viewed from above, for example, as shown in FIG. 6 where cover 36 is omitted.

Referring to FIG. 4, duct 37a is connected to air duct 38 extending in the top-bottom direction. This air duct 38 is provided with a plurality of air outlets 38a. Accordingly, the air blown by air-conditioning apparatus 61 can be discharged via duct 37a and air duct 38 into the indoor space in cab 3 through air outlets 38a.

Duct 37b further extends behind rear panel 39 and is connected to a duct (not shown) on the ceiling of the cab. Accordingly, the air blown by air-conditioning apparatus 61 can be ejected into the indoor space in cab 3.

Referring to FIG. 3, branch duct 62 is connected to duct 37c via connection duct 63. In other words, duct 37c is connected to air-conditioning apparatus 61 via connection duct 63 and branch duct 62. Connection duct 63 is arranged outside of the indoor space in cab 3 and below floor plate 31.

Figure 5:
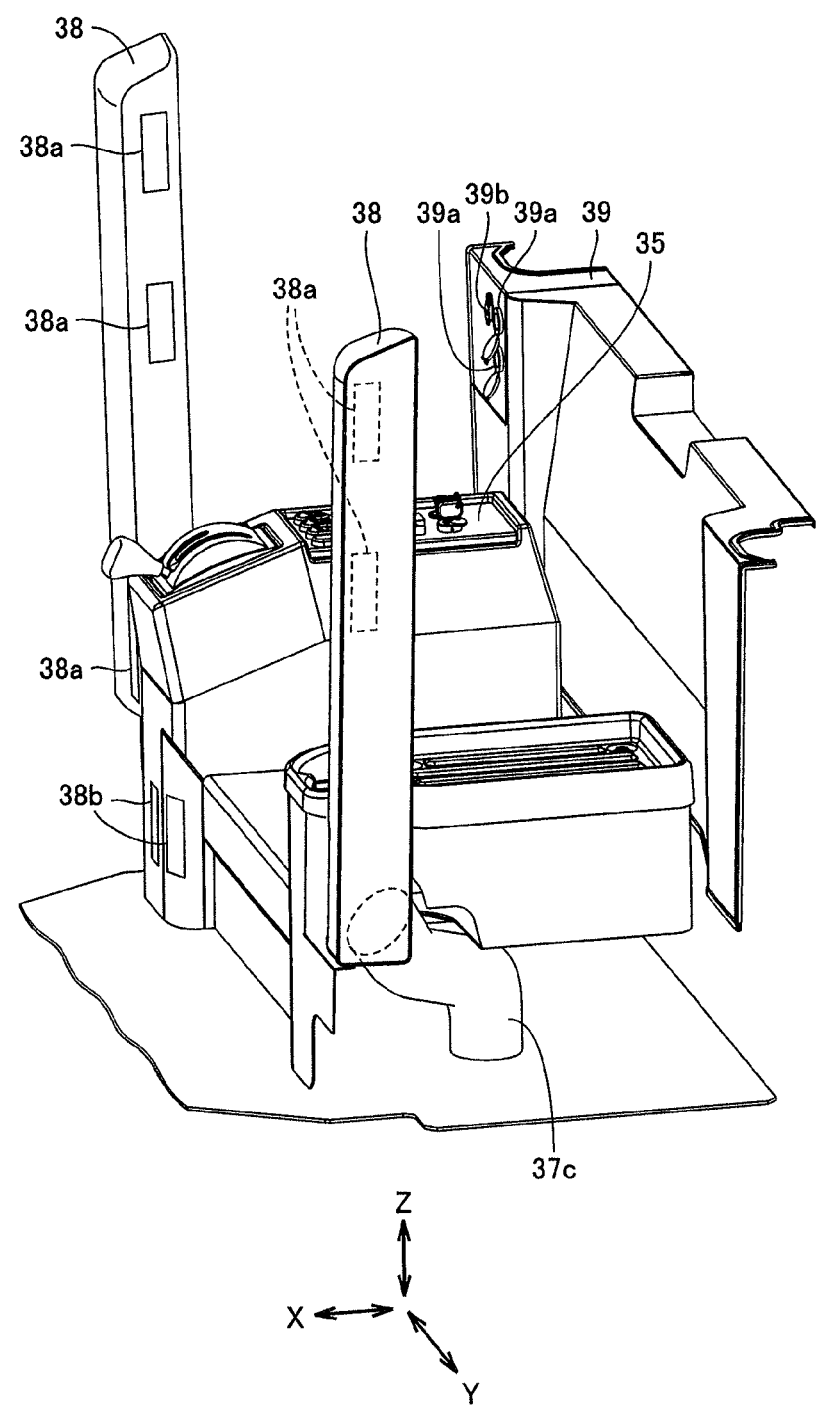
FIG. 5 is a schematic perspective view from above the left front, in which the pillars, the operator's seat and the like are omitted front the construction of the cab of the motor grader shown in FIG. 2.

Referring to FIG. 5, duct 37c is connected to air duct 38 extending in the top-bottom direction. This air duct 38 is provided with a plurality of air outlets 38a. Accordingly, the air blown by air-conditioning apparatus 61 can be ejected via duct 37c and air duct 38 into the indoor space in cab 3 through air outlets 38a.

As shown in FIGS. 4 and 5, the air blown into branch duct 62 may be discharged into the indoor space in cab 3 through air outlets 38b positioned below console 35. As shown in FIG.

2, the pair of air ducts 38 on the right and left is attached to the pair of center pillars 32b on the right and left, respectively.

Figure 7:
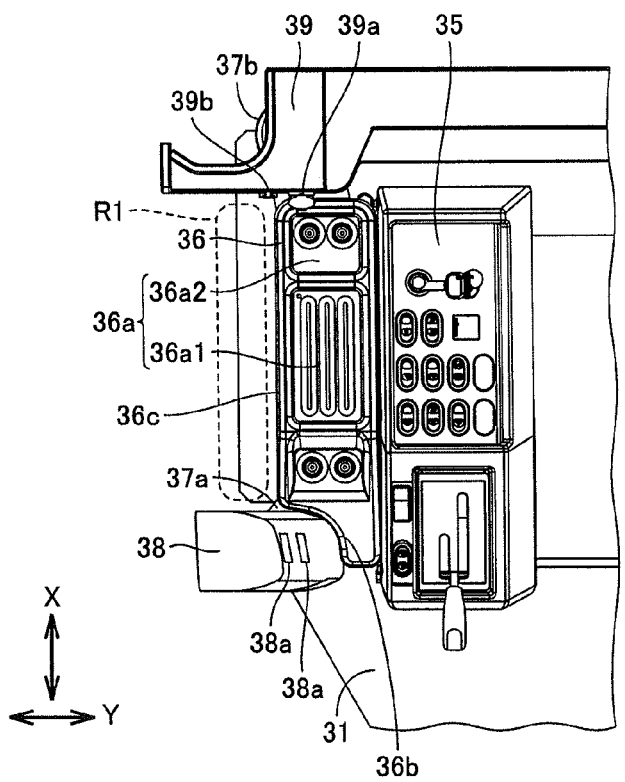
FIG. 7 is a schematic plan view (top view) showing a state in which the cover has been attached relative to the state shown in FIG. 6.

Referring to FIG. 6, duct 37a and duct 37b include portions projecting toward side window 3C on the right relative to console 35 when viewed from above, as described above. Referring to FIG. 7, cover 36 is arranged to cover an area directly above those portions of ducts 37a and 37b projecting toward side window 3C on the right relative to console 35.

Referring to FIG. 7, cover 36 includes a notch portion 36b at the front right side thereof. Cover 36 is positioned and attached by fitting this notch portion 36b with air duct 38 attached to center pillar 32b on the right. A gap space is provided in a region R1 between a rear portion 36c of cover 36 relative to notch portion 36b and side window 3C on the right.

Referring to FIG. 3, a lower end 3Ca of side window 3C on the right is positioned lower than an upper right end 35a of console 35 in terms of height from floor surface 31a of floor plate 31. In other words, a height H2 of lower end 3Ca of side window 3C on the right from floor surface 31a is shorter than a height H1 of upper right end 35a of console 35 from floor surface 31a.

An upper end 36d of cover 36 on the side close to side window 3C (right side) is positioned on or below an imaginary straight line A-A connecting upper end 35a of console 35 on the side close to side window 3C (right side) to lower end 3Ca of side window 3C on the right, and is not positioned above imaginary straight line A-A. Upper end 36d of cover 36 on the side close to side window 3C (right side) is positioned higher than lower end 3Ca of side window 3C on the right. In other words, a height H3 of upper end 36d of cover 36 on the side close to side window 3C (right side) from floor surface 31a is higher than height H2 of lower end 3Ca of side window 3C on the right from floor surface 31a.

Furthermore, in order not to obstruct the operator's view along the above imaginary straight line A-A, the gap space is provided without any other components in region R1 enclosed by a broken line between cover 36 and side window 3C on the right. In order not to obstruct the operator's view along the above imaginary straight line A-A, a gap space is also provided without any other components in a region R2 enclosed by a broken line positioned directly above cover 36 and on the right of console 35.

In the aforementioned regions R1 and R2, however, if another component is not arranged in a region above imaginary straight line A-A, another component may be arranged on imaginary straight line A-A or in a region below imaginary straight line A-A.

Rear panel 39 is arranged at the rear of cab 3. This rear panel 39 is provided with two power supply sockets 39a and an AUX terminal 39b, for example. Two power supply sockets 39a are positioned in a region R3 directly above the extent of width of cover 36, when the indoor space in cab 3 is viewed from the front (when viewed from the front toward the rear). AUX terminal 39b is arranged laterally to power supply sockets 39a.

Figure 8:
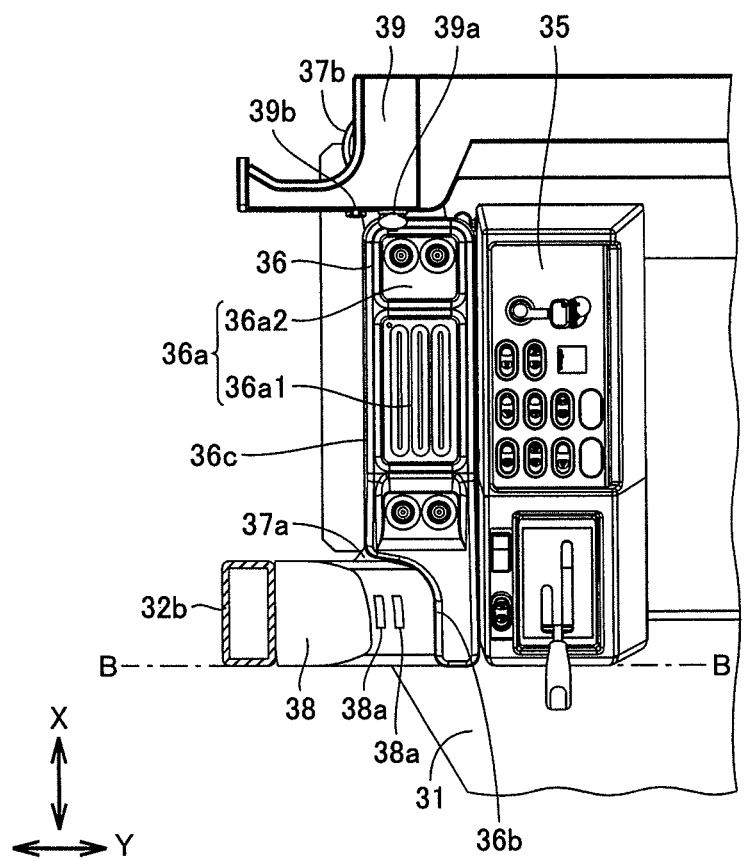
FIG. 8 is a schematic plan view (top view) showing the construction near the console and the cover when viewed in the direction of the outline arrow in FIG. 4, to show that the position of a front end of the console is aligned with the position of a front end of the cover.

Although the position of a front end of cover 36 has been illustrated above as being behind the position of a front end of console 35 when viewed from above as shown in FIG. 7, the position of the front end of cover 36 may be aligned with the position of the front end of console 35 when viewed from above, as indicated by a chain-dotted line B-B in FIG. 8. In this case, the position of a front end of air duct 38 and the position of a front end of center pillar 32b on the right may be aligned with the position of the front end of cover 36 and the position of the front end of console 35 when viewed from above, as indicated by chain-dotted line B-B.

Although console 35 and cover 36 have been described above as being arranged on the right of operator's seat 34, they may be arranged on the left of operator's seat 34, or may be arranged on both the right and left of the operator's seat.

A function and effect of this embodiment will now be described.

According to this embodiment, as shown in FIG. 3, cover 36 is arranged on the side of console 35 close to side window 3C, and covers an area above ducts 37a and 37b. Thus, exposure of ducts 37a and 37b to the inside of cab 3 is prevented. Accordingly, a satisfactory aesthetic appearance of the indoor space in cab 3 can be maintained.

If cover 36 is provided simply to cover ducts 37a and 37b, the visibility in an obliquely downward direction lateral to the operator may be obstructed. In this embodiment, however, cover 36 is arranged such that it is positioned on or below imaginary straight line A-A connecting upper end 35a of console 35 on the side close to side window 3C to lower end 3Ca of side window 3C, and such that it is not positioned above imaginary straight line A-A. Accordingly, even in the construction where lower end 3Ca of side window 3C is positioned lower than upper end 35a of console 35 on the side close to side window 3C, the visibility of the operator looking at lower end 3Ca of side window 3C with console 35 interposed therebetween is not obstructed by cover 36. Therefore, high visibility can be ensured in an obliquely downward direction lateral to the operator.

As described above, according to this embodiment, high visibility can be ensured in an obliquely downward direction lateral to the operator while a satisfactory aesthetic appearance of the indoor space in cab 3 is maintained.

In addition, as shown in FIG. 3, air-conditioning apparatus 61 is arranged between operator's seat 34 and floor surface 31a, and ducts 37a and 37b extend below console 35 and project toward side window 3C relative to console 35 when viewed from above as shown in FIG. 6. By arranging air-conditioning apparatus 61 below operator's seat 34 in this manner, the indoor space in cab 3 can be more effectively utilized.

Moreover, as shown in FIG. 7, cover 36 includes notch portion 36b at the front side thereof, and is positioned and attached by fitting this notch portion 36b with air duct 38. By providing notch portion 36b in this manner, cover 36 can be elongated toward the front while avoiding air duct 38. Thus, a long object can be stably placed on elongated cover 36. In addition, since cover 36 can be attached while being positioned relative to air duct 38 by notch portion 36b, cover 36 can be readily positioned when attached.

Furthermore, as shown in FIG. 7, the gap space is provided in region R1 between the rear portion of cover 36 relative to notch portion 36b and side window 3C. By providing the gap space and not arranging a component between the rear portion of cover 36 relative to notch portion 36b and side window 3C in this manner, the visibility of the operator looking at lower end 3Ca of side window 3C with console 35 interposed therebetween is not obstructed by the component. Therefore, the visibility in an obliquely downward direction lateral to the operator can be further improved.

In addition, as shown in FIG. 2, the upper surface of cover 36 is provided with concave portion 36a and the convex portion arranged around concave portion 36a. Since this concave portion 36a is formed with a depth relative to the convex portion, if an electronic device or the like is placed on this concave portion 36a, obstruction of the visibility of the operator looking at lower end 3Ca of side window 3C with console 35 interposed therebetween by the electronic device is suppressed. Furthermore, since concave portion 36a is formed with a depth relative to the convex portion, if an electronic device is placed on the concave portion, the convex portion prevents the electronic device from slipping out of cover 36.

Moreover, as shown in FIG. 8, the position of the front end of cover 36 is aligned with the position of the front end of console 35 when viewed from above. Accordingly, the front end of cover 36 can be aligned with the front end of console 35 along chain-dotted line B-B when viewed from above, to further enhance the aesthetic appearance of the indoor space in cab 3. Furthermore, since there is no level difference between the front end of cover 36 and the front end of console 35 when viewed from above, the operator can be prevented from tripping on or having the clothes caught on the level difference when moving within the indoor space in cab 3 or performing various operations.

Furthermore, as shown in FIG. 3, two power supply sockets 39*a* are positioned in region R3 directly above the extent of width of cover 36, when the indoor space in cab 3 is viewed from the front. Accordingly, when an electronic device or the like is placed on concave portion 36*a* of cover 36, the length of a power supply line between power supply sockets 39*a* and the electronic device can be shortened.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 motor grader; 2 body frame; 3 cab; 3A front window; 3B door; 3C side window; 3C*a* lower end; 3D rear window; 4 work implement; 5 rear work implement; 6 engine compartment; 11 front wheel; 12 rear wheel; 21 rear frame; 22 front frame; 25 exterior cover; 31 floor plate; 31*a* floor surface; 32*a* front pillar; 32*b* center pillar; 32*c* rear pillar; 33 roof; 34 operator's seat; 35 console; 35*a* upper end; 36 cover; 36*a*, 36*a*1, 36*a*2 concave portion; 36*b* notch portion; 37*a* to 37*c* duct; 38 air duct; 38*a* discharge outlet; 39 rear panel; 39*a* power supply socket; 39*b* AUX terminal; 40 drawbar; 41 circle; 42 blade; 44, 45 lift cylinder; 46 drawbar shift cylinder; 47 blade shift cylinder; 49 hydraulic motor; 51 ripper; 52 lift cylinder; 61 air-conditioning apparatus; 62 branch duct; 63 connection duct.

The invention claimed is:

1. A cab for construction machine having an internal space, comprising:

a side window arranged laterally to said operator's seat;

a console arranged between said operator's seat and said side window;

an air-conditioning apparatus arranged in said internal space;

a cover arranged between said console and said side window; and a bracket interposed between and fixed to said console and said cover, a lower end of said side window being positioned lower than an upper end of said console positioned on the side close to said side window in terms of height from said floor surface, an upper end of said cover positioned on a side close to said side window being positioned on or below an imaginary straight line connecting said upper end of said console positioned on the side close to said side window to said lower end of said side window, and being positioned above said lower end of said side window, said cab further comprising a duct connected to said air-conditioning apparatus and having a portion positioned between said console and said side window when viewed from above.

2. The cab for construction machine according to claim 1, further comprising an air duct extending in a top-bottom direction relative to said floor surface at a front side of said side window, wherein said cover includes a notch portion at said front side, and is attached by fitting said notch portion with said air duct.

3. The cab for construction machine according to claim 2, wherein a gap space is provided between a rear portion of said cover relative to said notch portion and said side window.

4. The cab for construction machine according to claim 1, wherein a concave portion and a convex portion arranged around said concave portion are provided in an upper surface of said cover.

5. The cab for construction machine according to claim 1, wherein the position of a front end of said cover is aligned with the position of a front end of said console when viewed from above.

6. A construction machine comprising the cab for construction machine according to claim 1.

* * * * *